(12) United States Patent
Spielmann et al.

(10) Patent No.: US 11,675,070 B2
(45) Date of Patent: Jun. 13, 2023

(54) HIGH-RESOLUTION 3D RADAR WAVE IMAGING DEVICE

(71) Applicant: IEE INTERNATIONAL ELECTRONICS & ENGINEERING S.A., Echternach (LU)

(72) Inventors: Thiemo Spielmann, Bivange (LU); Norbert Herschbach, Medernach (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 618 days.

(21) Appl. No.: 16/472,791

(22) PCT Filed: Dec. 21, 2017

(86) PCT No.: PCT/EP2017/084248
§ 371 (c)(1),
(2) Date: Jun. 21, 2019

(87) PCT Pub. No.: WO2018/115372
PCT Pub. Date: Jun. 28, 2018

(65) Prior Publication Data
US 2021/0135373 A1 May 6, 2021

(30) Foreign Application Priority Data

Dec. 23, 2016 (LU) .......................................... 93396
May 22, 2017 (LU) ........................................ 100259

(51) Int. Cl.
*G01S 7/03* (2006.01)
*G01S 13/89* (2006.01)
(Continued)

(52) U.S. Cl.
CPC .............. *G01S 13/89* (2013.01); *G01S 7/032* (2013.01); *G01S 13/32* (2013.01); *G01S 13/42* (2013.01);
(Continued)

(58) Field of Classification Search
CPC .......... G01S 13/89; G01S 13/32; G01S 13/42; G01S 7/032; G01S 7/027; G01S 7/481;
(Continued)

(56) References Cited

U.S. PATENT DOCUMENTS 5,185,613 A * 2/1993 Whatmore ............. H01Q 19/06
343/753
5,248,884 A * 9/1993 Brewitt-Taylor ....... H01L 31/09
257/E31.093

(Continued)

FOREIGN PATENT DOCUMENTS

DE 3931400 A1 12/2009
EP 2916140 A2 9/2015

OTHER PUBLICATIONS

International Search Report corresponding to International application No. PCT/EP2017/084248, dated Mar. 12, 2018, 4 pages.
(Continued)

*Primary Examiner* — Seokjin Kim
(74) *Attorney, Agent, or Firm* — Reising Ethington P.C.

(57) ABSTRACT

A radar wave imaging device includes a radar transmitter unit having at least one radar transmit antenna for transmitting radar waves towards a scene and a radar receiving unit including a plurality of radar receiver members that are arranged as a two-dimensional array, for receiving reflected radar waves. The radar receiving unit includes an imaging radar optics unit for imaging at least a portion of a scene onto at least a portion of the two-dimensional array of radar receiver members. The imaging radar optics unit includes at
(Continued)

least a first radar lens that is arranged between the radar receiver members and the scene. The radar receiver members are arranged in direct contact to a surface of the first radar lens that is facing away from the scene.

14 Claims, 14 Drawing Sheets

(51) Int. Cl.
    *G01S 17/89*     (2020.01)
    *G01S 13/32*     (2006.01)
    *G01S 13/42*     (2006.01)
    *H01Q 9/04*     (2006.01)
    *H01Q 19/09*     (2006.01)
    *H01Q 21/06*     (2006.01)
    *H01Q 21/24*     (2006.01)

(52) U.S. Cl.
    CPC ........... *G01S 17/89* (2013.01); *H01Q 9/0457* (2013.01); *H01Q 19/09* (2013.01); *H01Q 21/065* (2013.01); *H01Q 21/24* (2013.01)

(58) Field of Classification Search
    CPC ...... G01S 17/89; H01Q 9/0457; H01Q 9/045; H01Q 9/0407; H01Q 21/065; H01Q 21/24; H01Q 1/3233; H01Q 1/2283; H01Q 1/40; H01Q 1/523; H01Q 15/02; H01Q 13/10; H01Q 19/09; H01Q 19/062
    See application file for complete search history.

(56) References Cited

U.S. PATENT DOCUMENTS

| | | | |
|---|---|---|---|
| 8,994,581 B1 | 3/2015 | Brown et al. | |
| 2008/0272955 A1* | 11/2008 | Yonak | H01Q 15/0086 342/54 |
| 2008/0284655 A1* | 11/2008 | Alamouti | H01Q 19/062 343/700 MS |
| 2009/0267822 A1* | 10/2009 | Shinoda | G01S 13/4463 342/70 |
| 2010/0231436 A1* | 9/2010 | Focke | H01Q 15/08 342/70 |
| 2012/0229366 A1* | 9/2012 | Ding | H01Q 21/0075 343/907 |
| 2014/0077995 A1 | 3/2014 | Artemenko et al. | |
| 2014/0104124 A1* | 4/2014 | Chernokalov | H01Q 3/245 343/754 |
| 2015/0200452 A1 | 7/2015 | Oh et al. | |
| 2015/0253419 A1 | 9/2015 | Alland et al. | |
| 2016/0218429 A1 | 7/2016 | Klemes | |
| 2016/0352437 A1 | 12/2016 | Welle et al. | |
| 2018/0183152 A1* | 6/2018 | Turpin | G06F 30/20 |
| 2018/0348356 A1* | 12/2018 | Lynch | G01S 7/352 |

OTHER PUBLICATIONS

Written Opinion corresponding to International application No. PCT/EP2017/084248, dated Mar. 12, 2018, 9 pages.

S. Lutz et al, "Lens Based 77 GHz TDM MIMO Radar Sensor for Angular Estimation in Multitarget Environments", Institute of Medical Engineering and Mechatronics, University of Applied Sciences Ulm, Oct. 2013, pp. 212-215.

C. Pfeiffer et al, "Metamaterial Huygens' Surfaces: Tailoring Wave Fronts with Relfectionless Sheets" American Physical Society, May 2013, pp. 197401.1-197401.5.

* cited by examiner

Cross section A-A

Cross section B-B

Cross section A-A

Cross section B-B

Cross section A-A

Cross section B-B

Cross section A-A

Cross section B-B

Cross section A-A

Cross section B-B

HIGH-RESOLUTION 3D RADAR WAVE IMAGING DEVICE

TECHNICAL FIELD

The invention generally relates to a radar wave imaging device, usable for various applications such as people monitoring, building management and security as well as applications on moving platforms such as small unmanned aerial systems and automotive vehicles, and for sensing applications in the domain of Internet of Things.

BACKGROUND OF THE INVENTION

It is known in the art of military and avionic technology to employ radar technology. More recently the development of radar sensors has focused on the automotive field, in particular employing radar technology in the millimeter wave range between 75 and 81 GHz, in exterior automotive applications such as automotive ADAS (Advanced Driver Assistance Systems) for providing improved safety by facilitating an optimized reaction of a driver of a vehicle with appropriate warnings or even by automatically taking over control of the vehicle, for instance in collision avoidance systems.

In automotive radar applications one challenge is to determine the Direction of Arrival (DoA) of incoming radar waves which were transmitted towards and were reflected by targets. Common realizations deal with large patch antennas and beamforming algorithms.

By way of example, U.S. Pat. No. 8,994,581 B1 describes a method of DoA estimation, in which a vehicle is configured with a radar system used to aid in vehicle guidance. The method could include an array of antennas formed by a plurality of antennas configured to receive a radar signal. The array of antennas has a respective spacing between the given antenna and an adjacent antenna; however, the plurality of spacings includes at least two different spacings. A portion of the method may be performed by a processor configured to calculate a detection channel, based on a difference between differential phases associated with two antenna pairs in the array. The processor may also calculate an unambiguous angle based on the detection channel and the plurality of antenna spacings. Additionally, the processor may control the radar unit based on the calculated unambiguous angle.

European patent application EP 2 916 140 A2 describes a multiple-input and multiple-output (MIMO) antenna for a radar system for automotive application with improved grating lobe performance of the antenna. The MIMO antenna includes a first transmit antenna, a second transmit antenna, and a receive antenna. The first transmit antenna is configured to emit a first radar signal toward a target. The first transmit antenna is formed of a first vertical array of radiator elements. The second transmit antenna is configured to emit a second radar signal toward the target. The second transmit antenna is formed of a second vertical array of radiator elements distinct from the first vertical array. The receive antenna is configured to detect radar signals reflected by a target toward the receive antenna. The receive antenna is formed of a plurality of paired vertical arrays of detector elements.

The MIMO antenna includes spacing of multiple transmit and receive antennas in the horizontal dimension which simultaneously provides for higher gain antennas with half wavelength spacing of the virtual synthetic array to avoid grating lobes. To avoid grating lobes, the vertical arrays that form the TX and RX antennas are typically required to be spaced by half wavelength. A phase offset between virtual phase centers of the sub-arrays is corrected prior to digital beam-forming (DBF) in azimuth in order to eliminate grating lobes altogether.

In order to use the described conventional DoA estimation methods it is therefore mandatory to ensure a synchronization of the antennas on the scale of the carrier frequency, which in case of an exemplary carrier frequency of 100 GHz means a synchronization on the scale of picoseconds ($10^{-12}$ s).

Future demands are directed towards multiple small antennas mounted spread over a vehicle for providing multi-functionalities. However, a displacement of the antennas by multiple wavelengths leads to ambiguity in angular reconstruction when performed with conventional digital beam forming (DBF) methods.

An angular resolution of current radar devices, both in azimuthal and elevational direction, is not sufficient e.g. for automotive ADAS (Advanced Driver Assistance Systems) requirements, and neither for aerospace applications such as in drones and helicopters.

Using principles like digital beam forming (DBF) or beam steering, an angular resolution can be increased using additional individual antenna members in a large planar antenna array (phased array), however:

Size and complexity of a feed structure on a planar antenna substrate (so called front-end printed circuit board (PCB) made, for instance, of a PCB material suitable for the frequencies of radar operation) is a limiting factor for large cost-efficient phased arrays in small devices.

The large size of a multi-element phased array, by way of example 100 antenna members in a gate array (also called uncommitted logic array (ULA)) spaced by half a wavelength at a radar carrier frequency of 77 GHz would result in a dimension of about 20 cm, which is prohibitive for integration in passenger cars.

Due to a large overall size of the phased array, a required length of feed transmission lines of the individual antenna members will affect and limit the signal-to-noise ratio (SNR) of the radar device.

Alternatively, in case that distributed ICs (integrated circuits) are used for radar signal generation and detection that are arranged in close proximity to the individual antennas of the large phased array, the complexity of manufacturing increases substantially, as many individual ICs have to be connected by high-precision processes to the front-end PCB. Also, local oscillators have to be shared between the individual ICs to enable a coherent operation of the phased array.

SUMMARY

It is therefore an object of the invention to provide a radar wave imaging device that is capable of at least one of
detecting reflecting targets in its field of view,
unambiguously measuring a distance to each of the detected targets,
unambiguously measuring a relative radial velocity of each of the detected targets, and
measuring an angle of arrival of the reflected radar signal of each of the detected targets
with improved angular resolution.

General Description of the Invention

In one aspect of the present invention, the object is achieved by a radar wave imaging device. The radar wave imaging device comprises a radar transmitter unit and a radar receiving unit. The radar transmitter unit includes at least one radar transmit antenna and is configured for transmitting radar waves towards a scene with potential objects to be detected. The radar receiving unit is configured for receiving radar waves reflected by objects that have been illuminated by the radar waves transmitted by the transmitter unit. The receiving unit includes a plurality of radar receiver members that are arranged as a two-dimensional array.

The receiving unit includes an imaging radar optics unit for imaging at least a portion of the scene onto at least a portion of the two-dimensional array of radar receiver members. The imaging radar optics unit comprises at least one radar lens that is arranged between the radar receiver members and the scene. The radar receiver members are arranged in direct contact to a surface of the at least one radar lens that is facing away from the scene.

The phrases "being configured for" and "being configured to", as used in this application, shall in particular be understood as being specifically programmed, laid out, furnished or arranged.

The phrase "in direct contact", as used in this application, shall in particular be understood as the radar receiver members being at least partially encompassed by the at least one radar lens, as the radar receiver members directly abutting the at least one radar lens, or as the radar receiver members being arranged within an interface material arranged in immediate vicinity to the surface of the first radar lens facing away from the scene. In the latter case, internal reflection may occur at the boundary between lens material and the interface material, however the receiver member can still measure the evanescent field of the radiation. As the evanescent field strength decreases exponentially with increasing distance from the lens surface and the wavelength in the interface medium is the length scale parameter of this exponential decrease, the receiver members should preferably be positioned within a distance of much less than one wavelength of a carrier frequency of the transmitted radar waves to the surface of the first radar lens that is facing away from the scene. Here wavelength designates the wavelength in the interface material between that lens surface and the receiver member i.e., the vacuum wavelength divided by the refractive index of the interface material. In case, the radar receiver members are arranged in direct abutting contact to a surface of the first radar lens, higher signals can be measured at the receiver members as the electromagnetic waves do not need to transmit through the boundary between the lens material and the interface material.

In this way, the function of beamforming is performed by the imaging radar optics unit without any need for employing a beamforming method. Therefore, the radar wave imaging device is not based on digital beam forming techniques for a phased array that are known in the art, such as Barlett beamformer, Minimum Variance Distortionless Response (CAPON) beamformer or advanced beamforming methods such as MUSIC (MUltiple SIgnal Classification) and ESPRIT (Estimation of Signal Parameters by Rotation Invariant Techniques). In a suitable embodiment, a large detector array integrated on an integrated circuit can be provided. Using a high-refractive index material radar lens allows utilizing the high resolving power of the radar lens in order to image the scene, yielding a substantial increase in angular resolution compared to conventional small to midsized phased arrays.

It will readily be appreciated by those skilled in the art that the radar wave imaging device in accordance with the invention, when applied in existing advanced radar topologies such as frequency-modulated continuous wave (FMCW) radar or phase-modulated continuous wave (PMCW) radar, can allow the realization of radar range and Doppler matrix for each pair of radar transmitter unit and radar receiver member. By combining the range and Doppler matrices for all provided transmitter unit and radar receiver member pairs, a high-resolution 3D radar cube with range, Doppler velocity estimation and Direction Of Arrival (DoA) estimation can be generated.

Further, as will be readily acknowledged by those skilled in the art, the radar wave imaging device can comprise a radar wave generator for providing radar waves to the radar transmitter unit. Moreover, the radar wave imaging device can comprise a receiver circuitry for processing signals that have been generated in the radar receiver members by received radar waves that have been reflected by objects. It will be appreciated that the radar transmitter may operate at any suitable carrier frequency and within an operation frequency band of the electromagnetic spectrum of a certain bandwidth which has been licensed to the application at hand, e.g. X-band frequencies, the 24 GHz and 60 GHz industrial, scientific and medical (ISM) frequencies bands or W-band bands such as the automotive radar bands available or foreseen in the spectrum between 76 GHz and 81 GHz. The invention may also be used in other parts of the electromagnetic spectrum such as the upper mm-wave spectral ranges (e.g. 110 GHz-300 GHz), as well as THz or IR spectral ranges.

A receiver circuitry can contain one or more of the following items: a low-noise amplifier (LNA), an electronic mixer for homodyne/heterodyne mixing with a local oscillator (LO) to an intermediate frequency (IF), another subsequent LNA and an analog-to-digital converter (ADC) for digital conversion of the signal. In case of a code sequence type of radar device, the received and digitized signal can then be digitally correlated with the transmitted radar wave sequence in a correlator bank, yielding a range information. Typical digital radar signal processing e.g. Fourier transforms for velocity determination by estimation of the Doppler frequency shift can also be realized in the digital part of the receiver circuitry or in a dedicated signal processing IC. Note that in the case of receiver unit containing a multitude of receiver members, the receiver circuitry is best integrated together with the receiver members into a single integrated circuit.

The radar wave imaging device is particularly beneficial in automotive applications, i.e. for use in vehicles. The term "vehicle", as used in this application, shall particularly be understood to encompass passenger cars, trucks and buses.

The radar transmitter unit and the radar receiving unit can be integrated in a single integrated circuit, or likewise in a single subsystem consisting of several integrated circuits, in both cases implementing a monostatic radar system, as is schematically shown in FIG. 1. Also, the radar transmitter unit and the radar receiving unit can be distributed on a single vehicle or on different vehicles or can be otherwise distributed in space, implementing a bistatic radar system.

Preferably, the plurality of radar receiver members arranged as a two-dimensional array are arranged on a planar support plate. Embodiments in which the plurality of radar receiver members are arranged as a two-dimensional array on a curved surface of a support plate are also possible. The two dimensional array is understood to comprise more than 2×1 receiver members, preferentially more than 3×2 receiver members. Typically the applications will require a large number receiver members, e.g. 5×4 or 10×6 receiver members are used. As preferentially high volume applications are sought for the present invention, a cost efficient realization of the invention can be of interest. In typical cases, the array of receiver member will for this reason be arranged on the same IC as the receiver circuitry and the IC will be of market typical sizes, e.g. preferentially having side lengths below 12 mm. It will be noted that the use of a first radar lens arranged in direct contact with the radar receiver members leads to a form factor and spacing of said receiver members allowing the deployment of an array of receiver members of at least 3×2 receiver members directly on a receiver IC.

It is further noted herewith that the terms "first", "second", etc. are used in this application for distinction purposes only, and are not meant to indicate or anticipate a sequence or a priority in any way.

Preferably, the imaging radar optics unit includes at least one second radar lens that is arranged between the first radar lens and the scene. A much improved image quality with regard to lens aberration such as spherical aberration, coma, astigmatism, and field curvature can be achieved when a second radar lens that is appropriately designed is included into the imaging radar optics unit. It will be appreciated that the imaging radar optics unit may include more radar lens elements that are arranged between the first radar lens and the scene.

Preferably, the second radar lens is made from a material having a suitable refractive index to limit reflection of a substantial portion of incoming radar waves at the boundaries between the material of the second radar lens and the surrounding air. A clear upper limit for the refractive index of the second lens material to avoid total internal reflection at the backside of this lens cannot be simply given; it depends on the field of view required in the application and on how the optical system of two or more lenses is designed. Rays which hit the exit surface of the lens under an angle with respect to the surface normal that is larger or equal to the critical angle $\Theta_{critical}=\operatorname{asin}(n_{space}/n_{lens})$ will be totally reflected at the lens surface. This results in a loss of transmission through the lens and transmission fall-off. Anti-reflection coatings cannot prevent or alleviate this problem. When designing the optical system it is just an additional constraint to be respected that the rays on the exit surface of the lens have angles smaller than $\Theta_{critical}$ with respect to the surface normal. In the example shown in FIG. 4. $n_{space}$ is 1 and $n_{lens}$ is 1.5 resulting in $\Theta_{critical}=41.8°$. For $n_{lens}=3$ the critical angle would be 19.5° which would be too small in the example of FIG. 4. Choosing small values for $n_{lens}$ for example values around 1.5 relaxes the optical design constraint.

The first radar lens and the second radar lens may comprise surfaces that are a portion of a sphere (spherical). The surfaces may as well be a portion of a non-spherical, for instance a hyperbolic surface. In general aspheric lens surfaces as known in the art of lens design can be used as needed. As the requirements in angular resolution and field of view in elevation and azimuth angles may differ, an asymmetry in the imaging optics with respect to the two directions of the field view may be introduced, for instance by the use of cylindrical lens elements.

In preferred embodiments of the radar wave imaging device, the first radar lens comprises material having a refractive index larger than 3 and preferentially between 5.0 and 50.0 at a radar operation frequency band of the radar waves to be transmitted. In this way, a compact design of the radar wave imaging device can be accomplished. Because the radar receiver members are arranged in direct contact to a surface of the first radar lens that is facing away from the scene, a reflection of a substantial portion of incoming radar waves that would inevitably occur at the boundary between the material of the first radar lens and air can effectively be reduced or even avoided.

Preferably, the first radar lens includes at least one layer of anti-reflection coating at least on a surface directed towards the scene. In this way, a reflection of a substantial portion of the incoming radar waves that would inevitably occur at the boundary between the surrounding air and the material of the first radar lens can effectively be reduced. As is known in the art, a preferred thickness for a single layer of anti-reflection coating is close to a quarter of a wavelength at the radar operation frequency band of the radar waves divided by the refractive index of the layer material, and a preferred refractive index of the layer material is close to the square root of the refractive index of the material of the first radar lens.

In general, it is also contemplated that the first radar lens includes two or more layers of anti-reflection coating, as is commonly known in the art, and design rules for layer thickness and refractive indices are available from textbooks.

More realizations of the imaging radar optics unit are conceivable that contain other types of optical elements such as curved mirrors, and particularly also other types of lens elements such as holographic lens elements, kinoform lenses and lenses based on the concepts of metamaterials, including Huygens' metasurfaces. Huygens' metasurfaces are, for instance, described in the article by Carl Pfeiffer and Anthony Grbic, "*Metamaterial Huygens' Surfaces: Tailoring Wave Fronts with Reflectionless Sheets*", Phys. Rev. Letters 110, 197401-1 to -5 (2013), which shall hereby be incorporated by reference in its entirety with effect for the jurisdictions permitting incorporation by reference.

For the metasurface case, a selection of sub-wavelength dielectric or metallic meta-atom elements, each giving a different phase shift in transmission through the surface can be distributed in such a way on a flat or curved surface in order to realize a radar lens functionality. To ensure good transmission properties, an impedance of the surface of meta-atoms can be matched to the free space impedance. Optimally, the meta-atoms are constituted of the high refractive index material or of a metal or dielectric materials structure on the outer surface of the high refractive index material on top of the two-dimensional array of radar receiver members.

Examples for materials with a suitable refractive index are zirconium tin titanate ($ZrSnTiO_3$) and other zirconate materials, barium titanate ($BaTiO_3$), strontium titanate ($SrTiO_3$) and barium strontium titanate ($Ba_{1-x}Sr_xTiO_3$, $0<x<1$). For the technical realization of radar lenses, the refractive materials can be used in diverse forms and combinations. Examples are the crystalline form, sintered crystalline powders including powders of nano-crystals, glasses, as well as polymer materials filled with crystalline powders including nano-crystals.

In preferred embodiments of the radar wave imaging device, the radar transmitter unit comprises at least one modulation means for modulating the radar waves to be transmitted, wherein the modulation comprises at least one out of or a combination of amplitude modulation, frequency modulation and phase modulation.

In general, the transmitted radar waves can be modulated (frequency-modulated, amplitude-modulated, phase-modulated or any combination of these modulations) or unmodulated, for a continuous wave radar device.

It will readily be appreciated by those skilled in the art that the transmitted radar waves in an operation frequency band of a given bandwidth around a carrier frequency can form a constant frequency wave signal (as in a continuous wave (CW) radar device) or can form a pulse train signal with a suitable pulse width and pulse repetition rate. The transmitted radar waves can form any amplitude-modulated signal or frequency-modulated signal, such as a linear frequency-modulated signal (e.g. frequency-modulated continuous wave (FMCW) radar signal). The transmitted radar waves can also be formed by a combination of these analog modulations, such as a pulsed FMCW radar. The transmitted radar waves may also consist in Ultra-wideband (UWB) signals. Furthermore, the transmitted radar waves can also form a digital code sequence, which is coded using amplitude modulation, Orthogonal Frequency Division Multiplexing (OFDM) modulation, phase-modulated continuous wave (PMCW, using e.g. binary or quadrature phase shift keying), or any other modulations. The transmitted radar waves can be formed by a combination of analog and digital modulation methods. Preferably, amplitude, frequency or phase modulations or a combination of these are used, as they allow to resolve the range information and the Doppler shift of the transmitted radar waves reflected by an object or by objects.

As is known in the art, by applying appropriate modulation techniques, a radar wave imaging device for detecting reflecting targets in its field of view, and/or unambiguously measuring a distance to each of the detected targets, and/or unambiguously measuring a relative radial velocity of each of the detected targets, and/or measuring an angle of arrival of the reflected radar signal of each of the detected targets can be provided.

Depending on the nature of the applied modulation technique, the radar receiving unit comprises appropriate demodulation means.

Preferably, the radar receiver members comprise at least one out of a patch antenna, a slot antennas or a dipole antenna. By employing one of these antennas, which form resonating members at a frequency or frequencies and within the bandwidth of operation of a receiver circuitry for processing signals of the radar receiver members, electric signals can readily be generated that represent radar waves that are incident on the respective radar receiver member.

Depending on the frequency of operation of the receiver circuitry, the radar receiver members can also generate signals representing the received radar waves without any usage of a resonant structure (such as an antenna), but by detecting the incident radar waves directly by a material structure based on active or passive electromagnetic wave detection functionality, such as transistors, diodes, resistors or capacitive members of the CCD (charge-coupled device) kind.

Preferably, the radar wave imaging device comprises a receiver circuitry that is electrically connected to the plurality of radar receiver members and that is configured for analog and/or digital signal processing of the signals of the radar receiver members. At least one of the radar receiver members comprises at least one resonating member that is resonant in the operation frequency band. In this way, electric signals can readily be generated and processed that represent radar waves that are incident on the respective radar receiver member.

The phrase "electrically connected", as used in this application, shall be understood to encompass galvanic electrical connections, i.e. direct electrical contacts, as well as electrical connections established by capacitive and/or inductive electromagnetic coupling.

In preferred embodiments of the radar wave imaging device, at least one of the radar receiver members includes an antenna member that is configured for discriminating received radar waves according to their polarization. The polarization could be, for instance, right- and left-handed circular polarization or horizontal and vertical linear polarization. By using complex signal receive paths (i.e. detecting the in-phase and quadrature components) for the two different polarizations, also the handedness of a circular incoming radar waves could digitally be detected. Alternatively, using circular polarization antenna feeding methods, circular polarization could also be detected directly. The antennas could also be resonant at different frequencies for the two polarizations, realizing a simultaneous separation according to frequency and polarization. Separate antennas optimized for a single polarization could allow a higher polarization cross separation. Utilizing a linear or circular polarized transmitted radar wave allows to detect the polarimetric nature of the received radar wave that has been reflected by the objects in the scene to be analyzed, allowing a better characterization of the objects in the scene, as is well known in the art of radar polarimetry.

Preferably, the radar receiver members of the plurality of radar receiving members are mutually electromagnetically separated from each other by electromagnetic shields. In this way, electromagnetic cross talk between juxtaposed radar receiver members can beneficially be reduced or even almost eliminated. The electromagnetic shields can be made from metals with an appropriate electrical conductivity, or from geometrical structures of dielectric and/or metal materials effectively reducing the mutual coupling between the different receiver members such as so called "electromagnetic bandgap" metamaterial boundaries as for example described by Yang, F., Rahmat-Samii, Y., "Microstrip Antennas Integrated with Electromagnetic Band-Gap (EBG) Structures: A Low Mutual Coupling Design for Array Applications" (2003) IEEE Transactions on Antennas and Propagation, 51 (10 II), pp. 2936-2946.

In preferred embodiments of the radar wave imaging device, a spacing between the radar receiver members of the plurality of radar receiver members of the two-dimensional array is selected to be close to the diffraction limited spot diameter of the imaging optics, preferably the spacing is selected to be more than a factor of 0.5 times and less than a factor of 2.0 times said spot diameter. In this way, a spacing of the two-dimensioned array of radar receiver members can be adjusted to a diffraction limit of the imaging radar optics unit. Typically the imaging optics is designed in a such a way that the diffraction limited spot diameter of the imaging optics is smaller than $$\frac{5\lambda}{n}$$

and larger than $$\frac{\lambda}{n},$$

$\lambda$ being the wavelength of the carrier frequency of the signal to be detected and n the refractive index of the material of the first lens. A spacing between the radar receiver members of the plurality of radar receiver members of the two-dimensional array is in this case preferably larger than $$\frac{10\lambda}{n}$$

and smaller than $$\frac{\lambda}{2n}.$$

Preferably the diffraction limited spot diameter of the imaging optics is smaller than $$\frac{2\lambda}{n}$$

and larger than $$\frac{\lambda}{n}.$$

A spacing between the radar receiver members of the plurality of radar receiver members of the two-dimensional array is in this case preferentially smaller than $$\frac{4\lambda}{n}$$

and larger than $$\frac{\lambda}{2n}.$$

As is known in the art, the diffraction limit of the imaging radar optics unit is determined by a wavelength of the carrier frequency of the transmitted radar waves in the refractive material of the first radar lens, and a dimension (aperture) of the first radar lens or a combination of the first radar lens and the second radar lens, if applicable, in the direction perpendicular to the direction of propagation of the incident radar waves that have been reflected by objects.

Preferably, in the two-dimensional array, the radar receiver members are evenly spaced by a first spacing in a first dimension of the array, and are evenly spaced by a second spacing in a second dimension of the array that is perpendicular to the first dimension. In this way, a uniform imaging of the scene can be accomplished.

In preferred embodiments of the radar wave imaging device, the radar transmitter unit and the plurality of radar receiver members are configured to operate in a single-input and multiple-output or a multiple-input and multiple-output configuration.

In particular, in MIMO configurations each radar transmit antenna is understood to be able to transmit radar waves in an independent manner that represent mutually orthogonal codes. The orthogonality ("orthogonal waveforms") of the radar wave signals can be obtained using frequency division, time division, polarization division or code division multiplexing or other. Each radar receiving unit is further understood to be able to receive radar waves that have been transmitted by any one of the radar transmit antennas and that have been reflected by an object low amount of crosstalk disturbance. These embodiments provide the benefits of MIMO radar configurations regarding enlarged size of virtual aperture, improved spatial resolution and less sensitivity to interference signals, as is well known in the art.

In general, most advanced radar topologies (such as FMCW or PMCW) enable a realization of radar range and Doppler matrix for each pair of radar transmit antenna and radar receiver members. By combining the range and Doppler matrices for all pairs of radar transmit antennas and radar receiver members, a large radar cube can be generated. For the present invention, and in the case in which only a single transmit antenna is provided for, the beamforming can be done by the optical system, and the invention does not rely on digital beam forming techniques of a phased array.

In case that multiple transmit antennas are used, an uniform linear area spacing can for example be chosen for the transmission antenna array with the antenna spacing in one direction of the dimensions of the array, d, being for example a multiple of the half vacuum wavelength $$d = \frac{m\lambda}{2},$$

m∈{1,2,3, . . . }. In principle m could also take any real value such that m>1. The array of Tx antennas each transmitting an orthogonal waveform using one of the multiplexing techniques mentioned above, can be considered together with each single receiver member in the receiver unit as a "Multiple In Single Out" (MISO) multiplexing radar. Using a beamformer, such as for example the conventional (Bartlett) beamformer, an angle of arrival (AoA) estimation can be performed based on the phase difference of the radar wave signals transmitted by the different Tx antennas and received by a common receive antenna. If we consider for a moment collecting these radar wave signals using a traditional single Rx antenna with a wide field of view, the beamformer algorithms would result in an ambiguous object localization for m>1. These multiple AoA solutions $\Theta_i$ can be written as:

$$\sin(\Theta_i) = \sin(\Theta_0) \pm \frac{2i}{m}, 0 \le i \le \frac{m}{2},$$

and are spaced according to:

$$\Delta(\sin\Theta_i) = \frac{2}{m}.$$

Here $\Theta_i$ represent the angle between the ambiguous AoA directions and the normal to the surface of the array and $\Theta_0$ a small angle containing the high angular resolution information.

Using now the radar receiver members with the imaging system, each antenna member (or pixel) of the radar receiver member having a size $\Delta x$ (in the same direction as d for the Tx antenna array above) collects electromagnetic radiation from the field of view region associated with it. The angular width of said FOV may be written in a first approximation as $$\Delta(\sin\Theta_{pix}) = \frac{n\Delta x}{f},$$

n denoting the refractive index of the high refractive material of the first lens, and f the focal length of the first lens. By ensuring that $\Delta(\sin \Theta_i) \cong \Delta(\sin \Theta_{pix})$, the ambiguities given for any real m>1 in the transmit array can be lifted. Typically the values should be chosen such that $\Delta(\sin \Theta_{pix}) < 1.2 * \Delta(\sin \Theta_i)$, preferably $0.5\Delta(\sin \Theta_i) \le \Delta (\sin \Theta_{pix}) \le \Delta(\sin \Theta_i)$.

Of all possible AoA solutions, $\Theta_i$, only the real target AoA will result in a substantial signal in the receiver member of which the FOV contains the target's AoA. Thereby subpixel angular resolution on the array consisting of the plurality of receiver members can be achieved without ambiguity.

It should be noted that the features described in the previous two paragraphs can be applied or used either in one dimension or in two dimensions of the array, using the same or different Tx antenna array spacings d and number of antennas in the Tx array, possibly combined with asymmetric imaging optics introduced in paragraph [0026].

To clarify the multitude of options to realize a MIMO configuration with the present invention, a further preferential implementation of the MIMO realizations is detailed in the following. In a first dimension of the imaging plane a beamformer is used on multiple radar transmit antennas array in said first direction spaced e.g. d≤λ/2. The beamforming in the second dimension of the imaging plane is realized by e.g. by a cylindrical lens element as described in [0026] and a further one dimensional array of receiver members oriented perpendicular to the array of transmit antennas. The virtual radar cube (representing the radar cube of the virtual array) can be generated from combinations of the radar transmit antennas and radar receiver members used for the measurement.

In case that the transmitter and receiver units are places in different IC's, time and phase synchronization needs to be insured between them. This could for example be realized by sending one or more local oscillator signals from the transmitter IC using a microstrip line on the HF-PCB to the receiver.

In another aspect of the invention, an electromagnetic radiation receiving unit is provided. The electromagnetic radiation receiving unit is configured for receiving electromagnetic waves, in particular radar waves, being reflected by objects that have been illuminated by electromagnetic waves. The electromagnetic radiation receiving unit includes a plurality of receiver members that are sensitive to the electromagnetic waves and are arranged as a two-dimensional array. The electromagnetic radiation receiving unit further includes an imaging optics unit for imaging at least a portion of the scene onto at least a portion of the two-dimensional array of receiver members. The imaging optics unit comprises at least a first lens that is configured for refraction of the electromagnetic radiation. The first lens is arranged between the receiver members and the scene. The receiver members are arranged in direct contact to a surface of the first lens that is facing away from the scene.

The electromagnetic radiation receiving unit can be employed in the radar wave imaging device disclosed herein. The electromagnetic radiation receiving unit can also be used without a transmitter unit. Incident electromagnetic radiation can be indirect sun reflections, other electromagnetic sources such as thermal radiation, microwave, mm-wave, THz or infrared (IR) telecommunication sources, radar devices and the like.

In a suitable embodiment, the electromagnetic radiation receiving unit can enable to detect a direction of arrival (DoA) of the incident electromagnetic waves.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
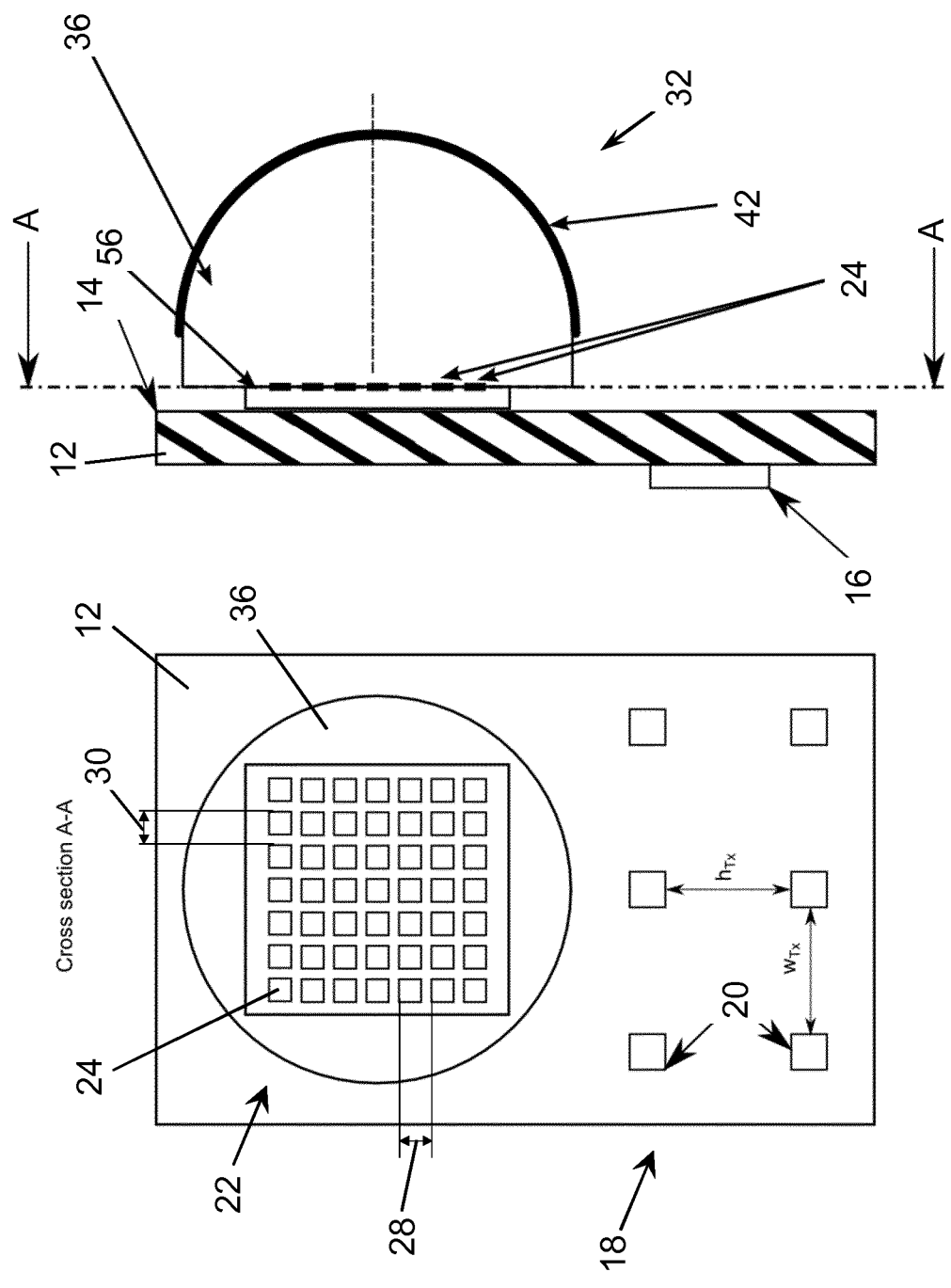
FIG. 1 schematically illustrates a possible embodiment of the radar wave imaging device in accordance with the invention in a side view and a sectional front view, FIG. 2 schematically shows an alternative embodiment of the radar wave imaging device in accordance with the invention in the same views, FIG. 3 schematically shows a possible configuration of the imaging radar optics unit and the plurality of radar receiver members of the radar wave imaging device, FIG. 4 schematically shows an alternative configuration of the imaging radar optics unit and the plurality of radar receiver members of the radar wave imaging device.

FIG. 1 schematically illustrates a possible embodiment of the radar wave imaging device 10 in accordance with the invention. The radar wave imaging device 10 includes a radar transmitter unit 18 and a radar receiving unit 22.

The radar transmitter unit 18 comprises a plurality of six radar transmit antennas 20 that are regularly arranged as a two by three two-dimensional array on a right side portion of a front surface 14 of a substrate plate 12 and connected to a transmitter circuitry 16. The radar transmit antennas 20 are directed towards a scene in front of the substrate plate 12. The scene may comprise objects, temporarily forming part of the scene, that are to be detected by the radar wave imaging device 10. The radar transmit antennas 20 of the radar transmitter unit 18 are configured for transmitting radar waves towards the scene. It should be noted that the transmitter circuitry 16 may be arranged below the substrate plate 12 as shown in FIG. 1, but it could also be placed on top of the substrate plate. The transmitter circuitry could also be integrated into the receiver integrated circuit (56)

The radar transmit antennas 20 of the radar transmitter unit 18 do not necessarily have to be arranged with even spacing. In an alternative embodiment of the radar wave imaging device 10' illustrated in FIG. 2, a plurality of 13 radar transmit antennas 20' is arranged with diverse spacing between the radar transmit antennas 20' all over the front surface 14 of the substrate plate 12.

Referring again to the embodiment shown in FIG. 1, the radar receiving unit 22 includes a plurality of 49 radar receiver members 24 that are arranged as a two-dimensional array of seven by seven, and are integrated in an integrated receiver circuitry in the receiver IC 56, which, in turn, is arranged on an upper portion of the front surface 14 of the substrate plate 12, on the left of the radar transmit antennas 20. The radar receiving unit 22 is configured for receiving radar waves reflected by objects that have been illuminated by the radar waves transmitted by the radar transmitter unit 18.

The integrated circuit (IC) 56 has been prepared using state-of-the-art integrated circuitry manufacturing techniques which may include the Back End of Line (BEOL) for creation of RF transmission lines and structures for metal radar receiver members.

The radar transmit antennas 20 of the radar transmitter unit 18 and the plurality of radar receiver members 24 are configured to operate in a multiple-input and multiple-output (MIMO) configuration. The radar transmitter unit 18 comprises modulation means (not shown) for phase-modulating radar waves to be transmitted. The radar transmit antennas 20 are configured to transmit mutually orthogonal radar wave signals formed by phase-modulated continuous waves (PMCW), coded e.g. via a sequence of binary symbols. Likewise, the radar transmitter unit 18 could comprise a means for frequency modulation and which case the transmit antennas could for example be configured to transmit orthogonal linear frequency modulations chirps using time division multiplexing. The modulation of the transmitted radar waves allows for one or more of detecting reflecting objects in the scene, measuring a distance to each of the detected objects, measuring a relative radial velocity of each of the detected objects and measuring an angle of arrival of the reflected radar signal of each of the objects, as is well known in the art. It will be appreciated that the invention is not limited to the use of a single patch antenna for each transmitter. In fact the skilled person will appreciate that a single transmitter channel may consist of multiple patch antennas connected in parallel in order to focus the energy within a certain field of view.

The radar wave imaging device 10 further comprises a receiver integrated circuitry 56 that is electrically connected to the plurality of radar receiver members 24 and that is configured for analog and/or digital signal processing of the signals of the radar receiver members 24. Each of the radar receiver members 24 comprises a resonating member that is resonant in the operation frequency band around the carrier frequency for which the receiving unit 22 has been designed, as will be set out in detail below.

Figure 3:
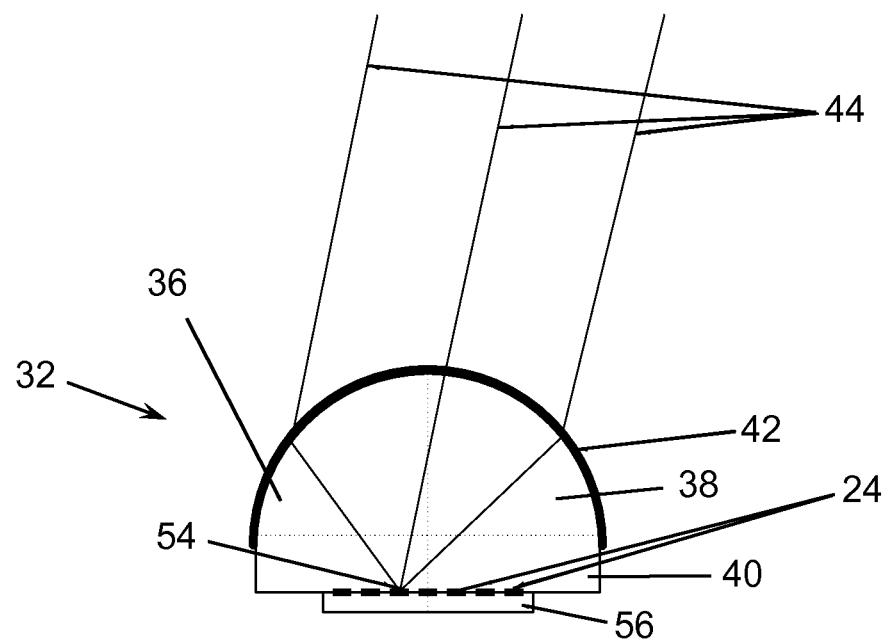

The radar receiving unit 22 further includes an imaging radar optics unit 32 for imaging at least a portion of the scene that defines a field of view (FOV), onto at least a portion of the two-dimensional array of radar receiver members 24. A detailed view of a configuration of the imaging radar optics unit 32 and the plurality of radar receiver members 24 are schematically shown in FIG. 3.

The imaging radar optics unit 32 comprises a first radar lens 36 that is arranged between the radar receiver members 24 and the scene with potential objects to be detected. The first radar lens 36 has a plano-convex design and comprises a half sphere portion 38 having a radius of e.g. 70 mm joined on to a cylindrical portion 40 of same radius. The half sphere portion 38 of the first radar lens 36 is directed towards the scene, and the plane surface of the cylindrical portion 40 the first radar lens 36 is facing away from the scene. The radar receiver members 24 are arranged in direct contact to the plane surface of the cylindrical portion 40 of the plano-convex first radar lens 36 such that the radar receiver members 24 are partially encompassed by the first radar lens 36.

The first radar lens 36 comprises e.g. a material having a refractive index of e.g. 10.0 at a radar carrier frequency of the radar waves to be transmitted, which is 78.0 GHz with a bandwidth of 2.0 GHz. The first radar lens 36 comprises a single-layer anti-reflection coating 42 having a thickness of $\lambda/(4n_c)=0.30$ mm for the wavelength $\lambda$ of 3.84 mm of the radar waves to be transmitted and a refractive index $n_c$ of about $\sqrt{10.0}\approx3.2$ for the layer material on a surface of the half sphere portion 38. A radar beam 44 of reflected radar waves coming from a point of an object in the scene is imaged by the first radar lens 36 onto an image point 54 lying in the plane of the array of the radar receiver members 24. A region illuminated by each radar transmit antenna 20 of the radar transmitter unit 18 overlaps with a field of view of the imaging radar optics unit 32.

Figure 2:
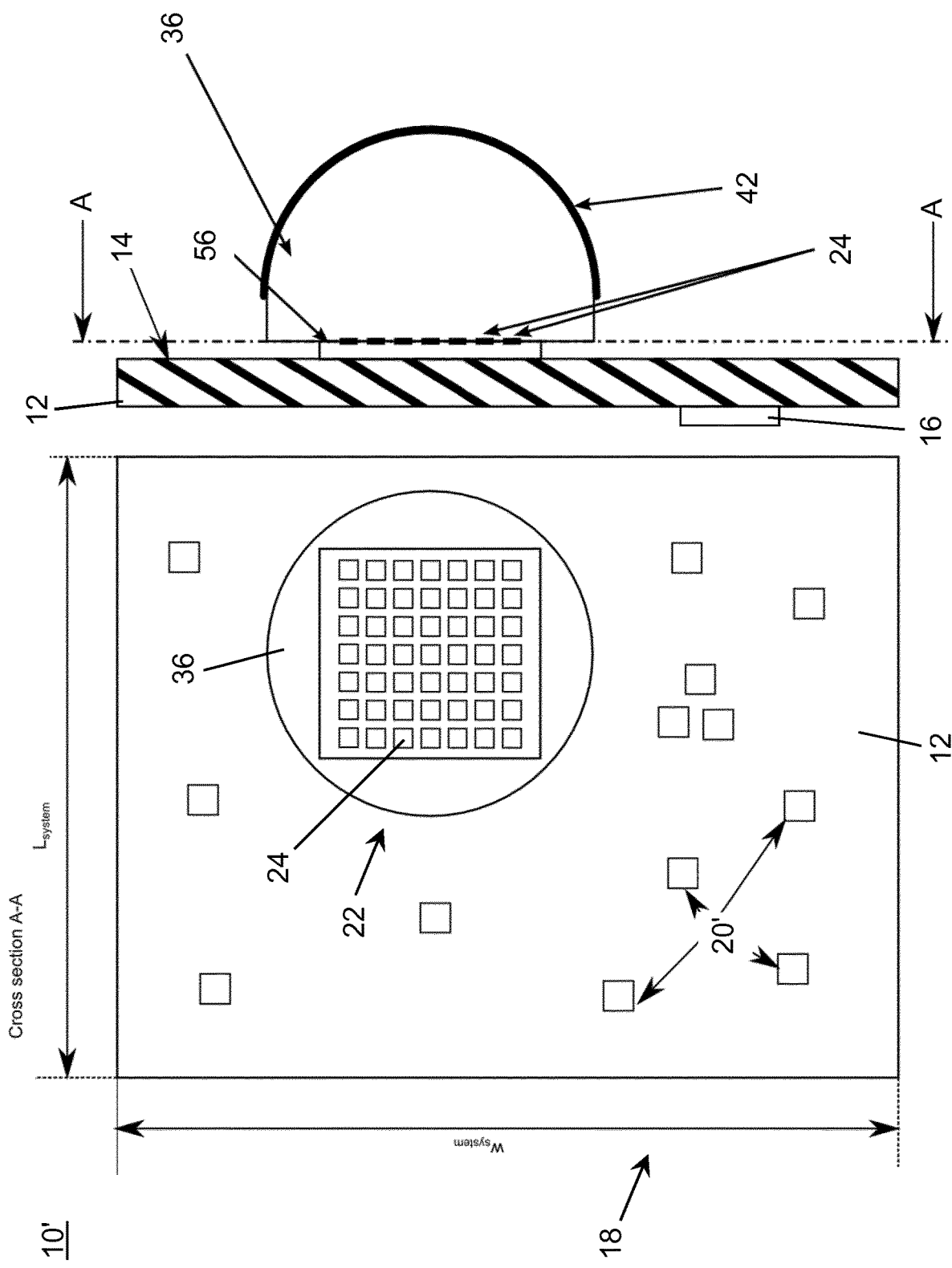
Figure 4:
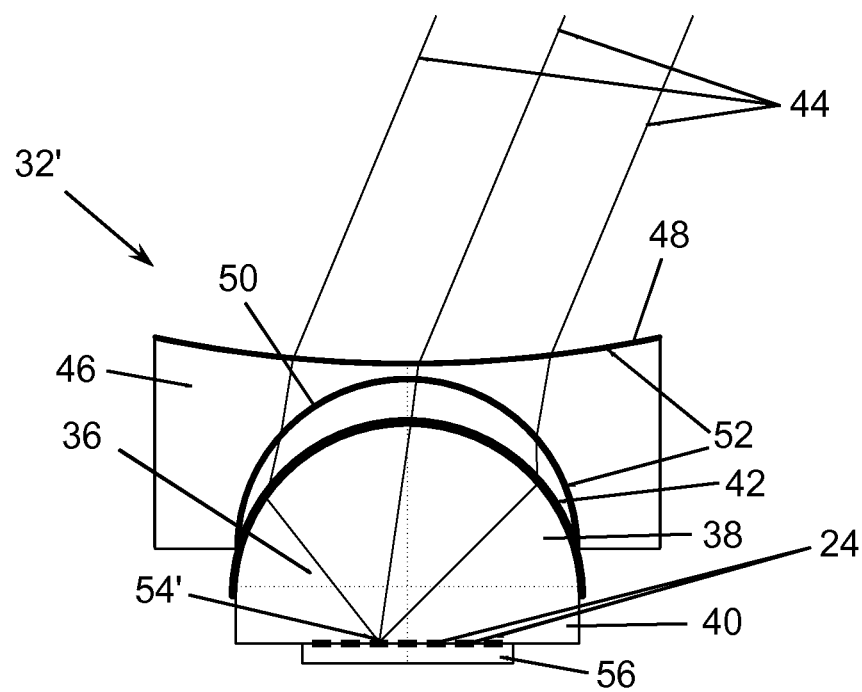

A technical implementation of the first radar lens 36 could, for instance, be based on a plastic container structure defining the lens surfaces and which may be manufactured by injection molding techniques. The plastic container can be filled with various required refractive index materials, for example by using thermoplastics filled with particles to increase a refractive index. Moreover, self-curing, thermal curing, ultraviolet curing or composite adhesive materials filled with particles to increase the refractive index can be used. In all these material mixtures, the filler particles may be made of the high-refractive index materials mentioned in this application. Walls of the container structure can be designed in wall thickness and refractive index of the chosen material to form an appropriate anti-reflection coating 42 of the first radar lens 36. It should be noted that other more conventional ways to technically realize the lens with a large refractive index comprise machining sintered or pressed ceramic powders, sintering or pressing ceramic powders in a mold or machining the lens shape into a chunk of a crystalline or polycrystalline material In order to improve an imaging quality, an imaging radar optics unit 32' of the embodiment of the radar wave imaging device 10 pursuant to FIG. 1 or 10' pursuant to FIG. 2 is equipped with a second radar lens 46 that is arranged between the first radar lens 36 and the scene (FIG. 4). The second radar lens 46 has a biconcave design with a radius of curvature of −500 mm for a surface facing the scene (front surface 48) and a radius of curvature of 70 mm for a surface facing away (back surface 50) from the scene. The second radar lens 46 is made from a material with a refractive index of about 1.5 in the operation frequency band of the radar waves to be transmitted. Examples for materials with refractive index in this range are known optical glasses and crystal materials, sintered crystalline materials as well as polymer materials. With such a refractive index, losses by reflection would be limited at perpendicular incidence of the radar waves to about 4% for each air-lens boundary surface. For further reducing these reflection losses, the surfaces of the second radar lens 46 have an anti-reflection coating 52 of a thickness of $\lambda/(4\,n_c')=0.78$ mm and a refractive index $n_c'$ of about $\sqrt{1.5}\approx 1.22$ for the layer material.

A thickness of the second radar lens 46, i.e. a distance between vertices of the front surface 48 and the back surface 50, is 5.0 mm. The distance between the vertex of the back surface 50 of the second radar lens 46 and the vertex of the half sphere portion 38' of the first radar lens 36 is 20 mm. The space between the first radar lens 36 and the second radar lens 46 is assumed to be filled with a material of refractive index of 1.0, namely with air.

The combination of the first radar lens 36 and the second radar lens 46 has a focusing effect. The radar beam 44 of reflected radar waves coming from a point of an object in the scene is imaged by the combination of the first radar lens 36 and the second radar lens 46 onto an image point 54' lying in the plane of the array of the radar receiver members 24.

In the two-dimensional array of the embodiment of the radar wave imaging device 10 pursuant to FIG. 1, the radar receiver members 24 are evenly spaced by a first spacing 28 in a first dimension of the array, and are evenly spaced by a second spacing 30 in a second dimension of the array that is perpendicular to the first dimension. The first spacing 28 and the second spacing 30 are selected to be more than a factor of 0.5 times and less than a factor of 2.0 times a diffraction limited spot diameter of the imaging radar optics unit 32.

Figure 5:
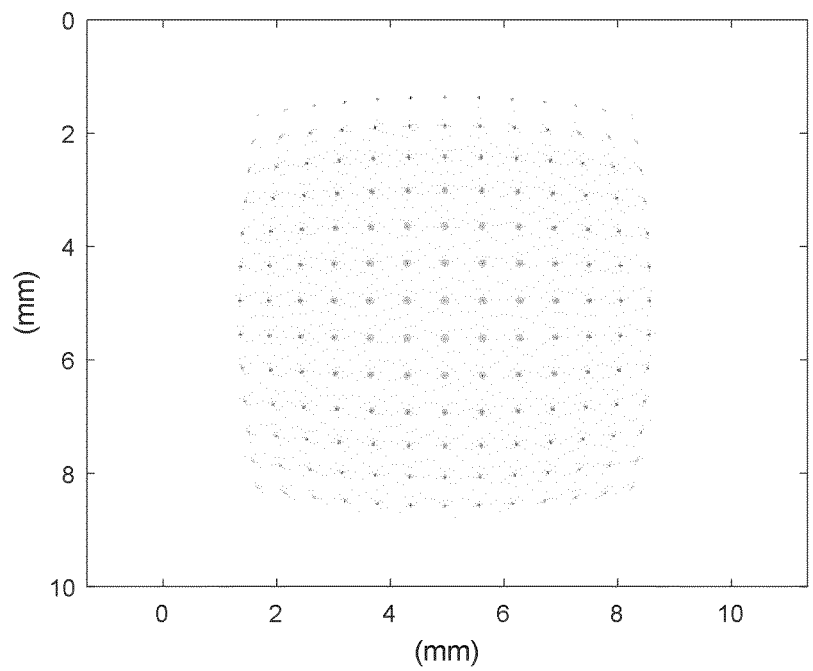
FIG. 5 shows a plotted result of a ray tracing calculation of an imaging of regularly positioned point sources imaged by the imaging radar optics unit pursuant to FIG. 4 onto the plurality of radar receiver members.

FIG. 5 shows a plotted result of a ray tracing calculation of an imaging of regularly positioned point sources imaged by the imaging radar optics unit 32' pursuant to FIG. 4 onto the plurality of radar receiver members.

The calculation simulates an imaging of 13 times 13 point sources that are regularly positioned in a square area of 12 m by 12 m and in a distance of 10 m from the vertex of the front surface 48 of the second radar lens 46. The grey scale values of the graph represent a number density of impacts of rays on a plane orthogonal to an optical axis of the imaging radar optics unit 32' and being located 106.8 mm behind the vertex of the front surface 48 of the second radar lens 46 or 11.8 mm behind a center of the surface of the half sphere portion 38 of the first radar lens 36. To prevent an excessive blur of the corner spots by the field curvature of the imaging radar optics unit 32', the plane was chosen to lie about 0.5 mm in front of the focal plane in this embodiment.

In this way, corner spots are still well-resolved and central spots are only slightly out of focus. Moderate amounts of lens aberration, such as spherical aberration, astigmatism, coma and barrel distortion are visible. The intensity fall-off from the center spot to the outmost spot in horizontal direction, for example, is only about 20%. The exemplary calculation shows that according to the rules of geometrical optics, the imaging of a FOV of about 60 horizontally times 60° vertically onto an area of about 7.5 mm by 7.5 mm is possible with a sufficient resolution. An effective aperture of the imaging radar optics unit 32' can also be inferred from a ray tracing calculation, and can be used to estimate the diffraction-limited spot size. In this specific embodiment and for the wavelength $\lambda$ of 3.84 mm of the radar waves to be transmitted, the diffraction-limited spot in the imaging has a diameter of 0.54 mm for the central spot and a diameter of 0.77 mm for the outmost spots on the diagonal. Thus, also with diffraction taken into account, imaging with a good resolution is possible even for relatively large wavelength values.

Figure 6:
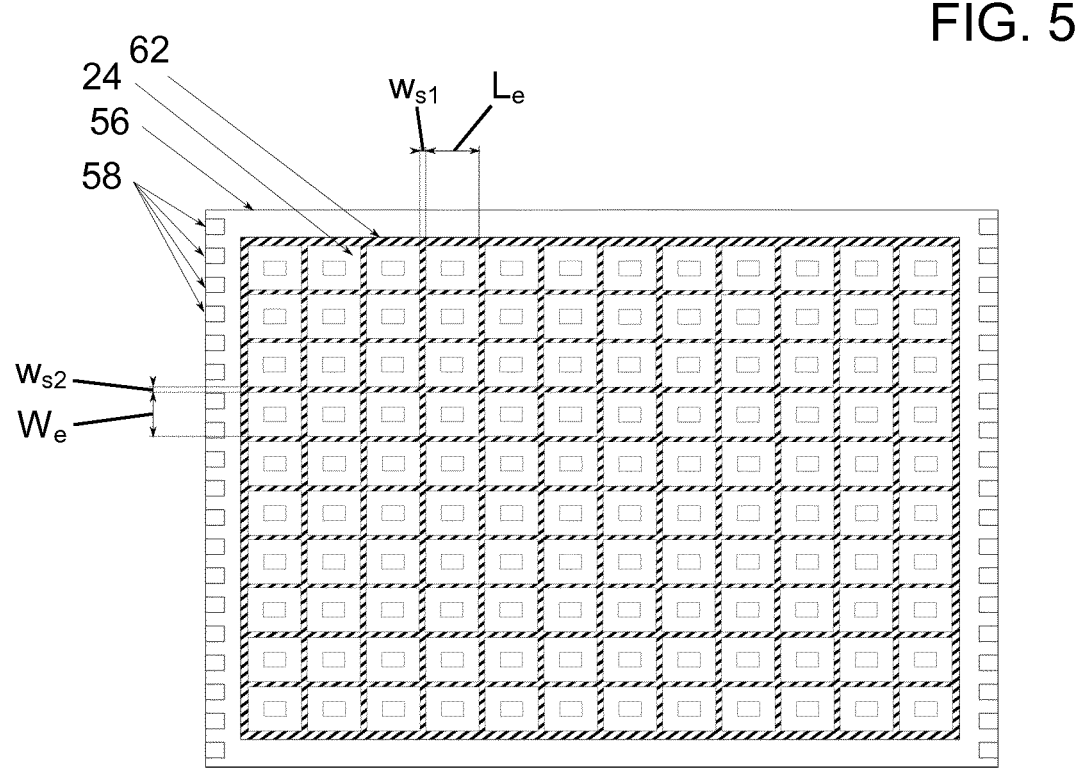
FIG. 6 shows a schematic illustration of a plurality of radar receiver members arranged in a two-dimensional array, FIG. 7 schematically illustrates a radar receiver member of the plurality of radar receiver members pursuant to FIG. 6, FIGS. 8 to 16 schematically show alternative possible embodiments of a radar receiver member.

FIG. 6 shows a schematic illustration of an alternative plurality of radar receiver members 24 arranged in a two-dimensional array of ten by twelve. The radar receiver members 24 are evenly spaced by a first spacing ($L_e+w_{s1}$) in a first dimension of the array, and are evenly spaced by a second spacing ($W_e+w_{s2}$) in a second dimension of the array that is perpendicular to the first dimension. The first spacing and the second spacing are selected to be close to the diffraction limited spot diameter of the imaging radar optics unit 32' of FIG. 4.

The imaging radar optics unit 32' focuses the incident radar waves on the radar receiver members 24 ("pixels") arranged as a two-dimensional array. The radar receiver members 24 of the plurality of radar receiver members 24 are mutually electromagnetically separated from each other by electromagnetic shields designed as a shielding region that reduces an electromagnetic cross talk between neighboring pixels. In this specific embodiment, the shielding region is provided by a grounded metal layer 62 that is grounded by using closely spaced vias (electric boundary), as will be set out in more detail below. In other embodiments, the electromagnetic separation could be provided using high-absorptive material or using a boundary made of an electromagnetic bandgap metamaterial.

In case that the radar receiver members 24 are directly integrated on the receiver integrated circuit (IC) 56, as is schematically shown in FIG. 6, connector pads 58 could be provided at a side region of the IC 56 for control and output signals as well as for supply voltages. The connector pads 58 could also be arranged on a back side of the IC 56 shown in FIG. 6.

FIGS. 7 to 16 schematically show possible embodiments of radar receiver members 24 of a radar receiving unit 22 of the radar wave imaging device 10 in accordance with the invention. For the sake of brevity, from the second embodiment on, only differences between the various embodiments will be described.

Each radar receiver member 24 comprises a resonating element designed as an antenna member 26 on a substrate, electromagnetically coupled to a transmission line 66, which connects the antenna member 24 to the subsequent receiver circuitry in the receiver IC 56 for analog and digital signal processing.

The invention is not limited to the antenna members 24 shown in FIGS. 7 to 16, as at least some embodiments of the invention can be implemented with any resonant structure that is able to transmit at least a portion of signal generated by the received radar waves to further analog and/or digital signal processing in the receiver circuitry 56 adapted to the frequency of operation. Some parts of the signal processing steps, especially parts of the digital signal processing, may also take place in separate IC's or in the transmitter IC 16.

Figure 7:
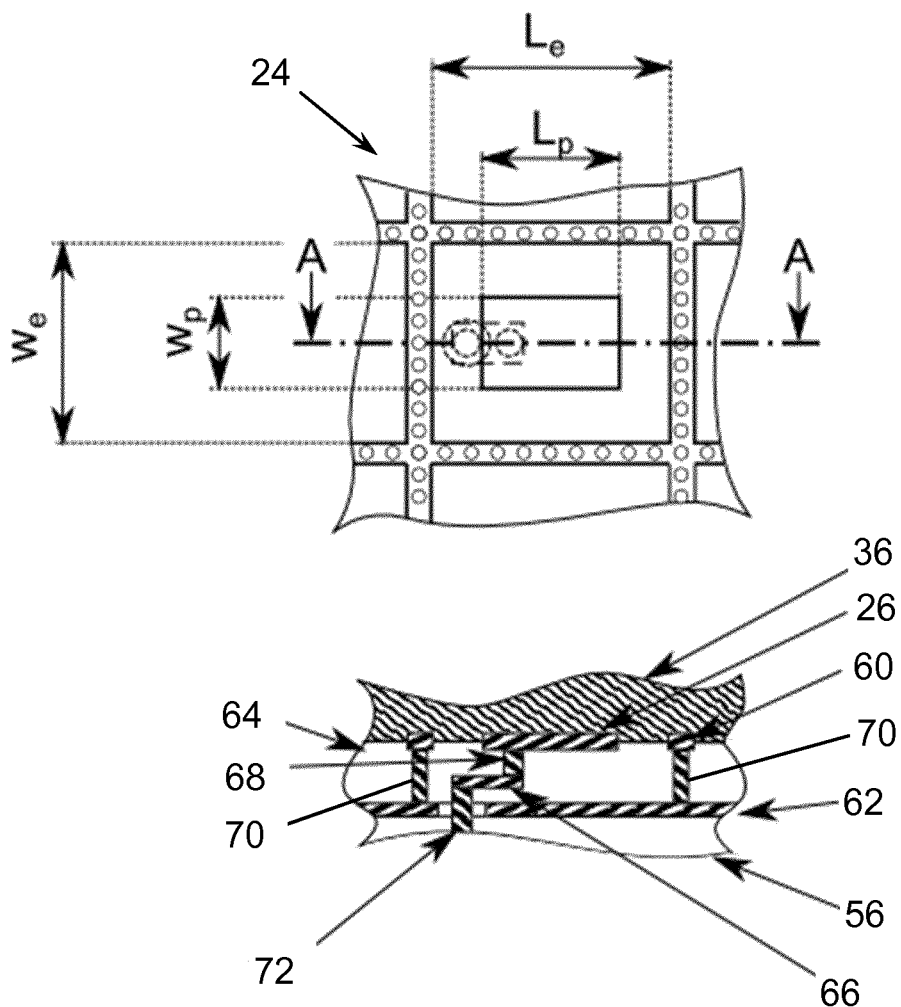

Referring to FIG. 7, each radar receiver member 24 comprises an antenna member 26 designed as a patch antenna that is resonant at the carrier frequency (or at frequencies) and within the bandwidth(s) of operation of the receiver unit 22. As the antenna member 26 is in direct contact with the material of the first radar lens 36 having a relatively large refractive index, a length $L_p$ of the patch antenna of 0.195 mm and a width $W_p$ of 0.156 mm are chosen such that the resonance lies at the frequency of operation. For very large refractive index materials of the first radar lens 36, like for instance a refractive index of more than 10, $L_p$ is of the order of magnitude of $\lambda/(2\cdot n)$, with $\lambda$ denoting the vacuum wavelength and n denoting the refractive index. The patch antenna 26 is connected through a dielectric material 64 made from silicon dioxide ($SiO_2$) having an electric permittivity of about 4.2 using a via 68 to a copper microstrip line 66 having a width of about 0.06 mm. A shielding layer 60 is galvanically connected with closely spaced vias 70 to a grounded metal layer 62 that separates the patch antennas 26 from top metal transmission lines. The microstrip line 66 is electrically connected to the receiver circuitry 56 implemented on the IC 56 using an additional via 72.

Figure 13:
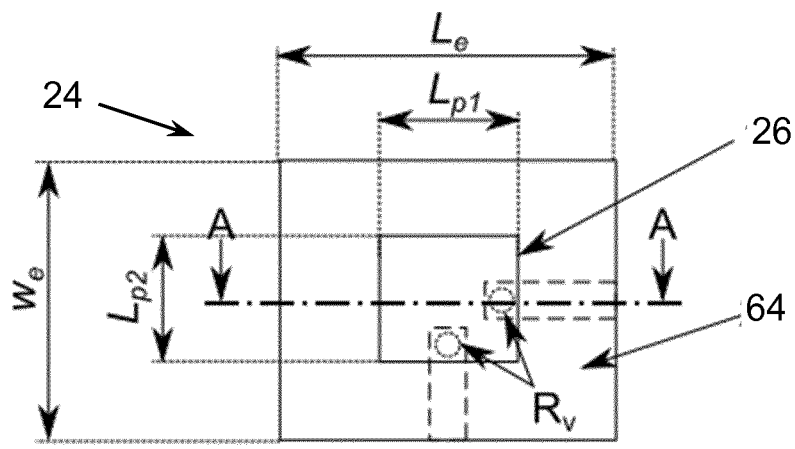
Figure 13:
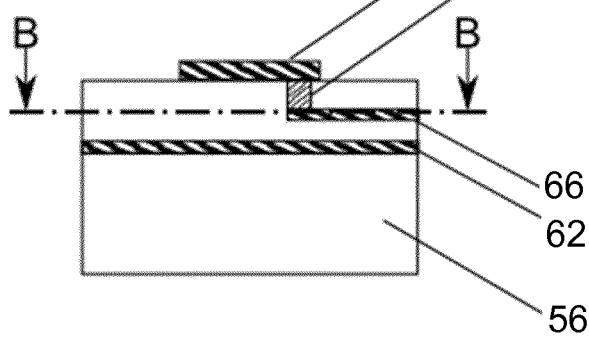
Figure 13:
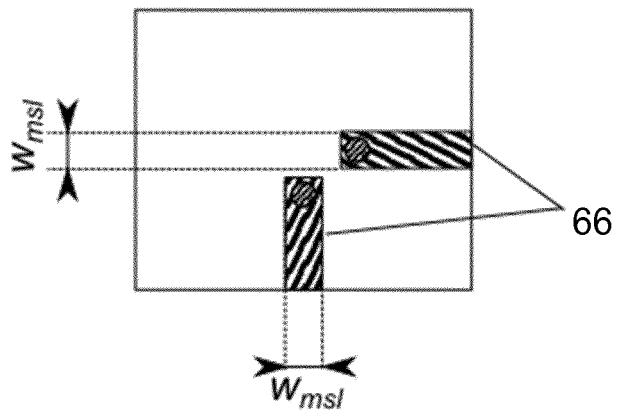
Figure 14:
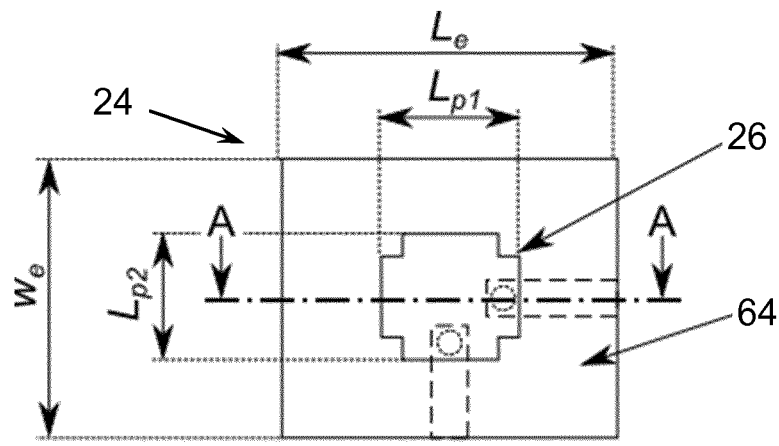
Figure 14:
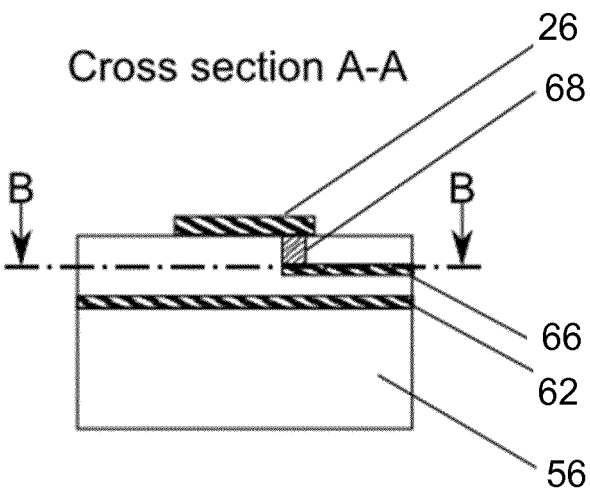
Figure 14:
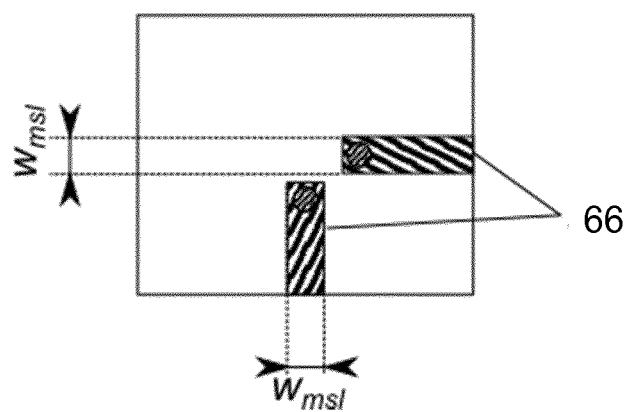

The resonant element (i.e. the antenna member 26) may take any form such as a cylinder, a rectangular or a square patch or more advanced forms, such as the patch antenna shown in FIG. 14. The resonant element may be implemented as a metal structure on a dielectric substrate, as in FIGS. 9 to 14, or as an opening (slot) in a top metal ground layer, such as the slot antennas in FIGS. 15 and 16. Furthermore, the resonating elements can also be of dielectric nature and be implemented by suitable geometrical structures of a material of a given refractive index on a substrate of the same or a different refractive index.

Figure 8:
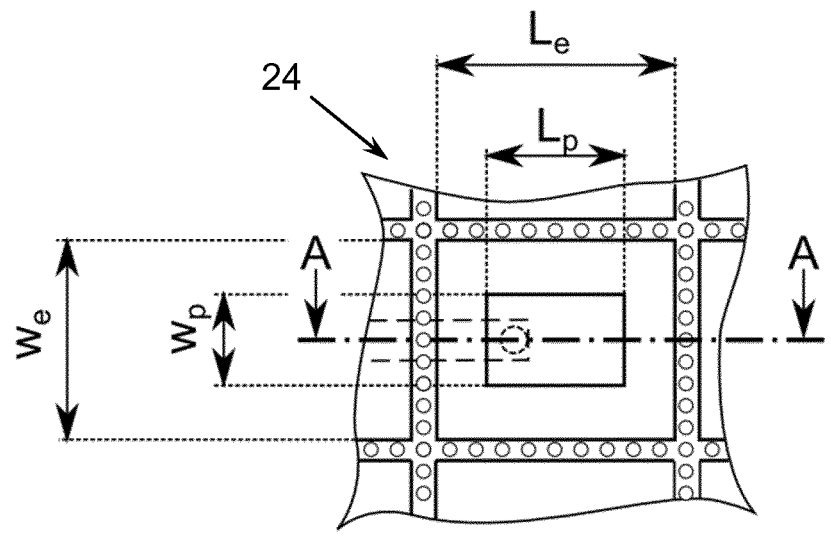
Figure 8:
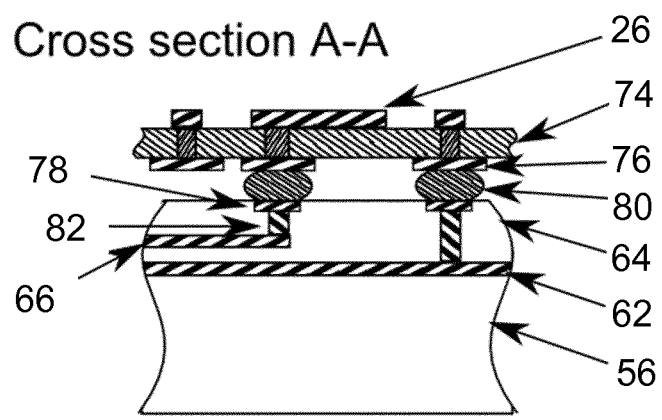
Figure 9:
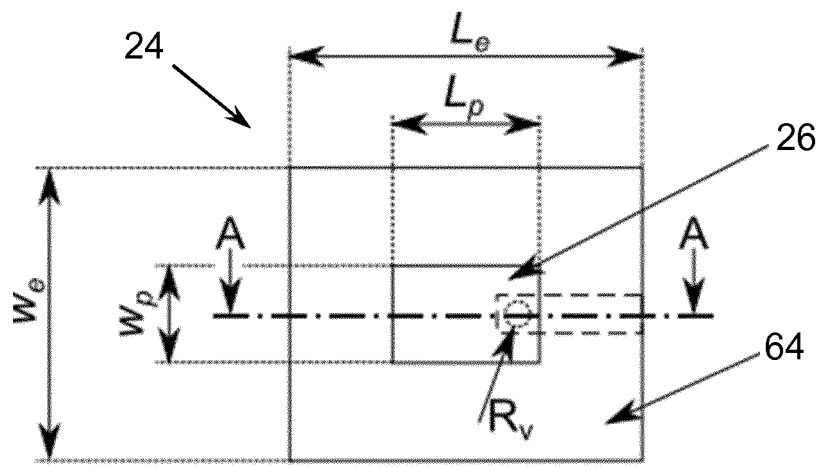
Figure 9:
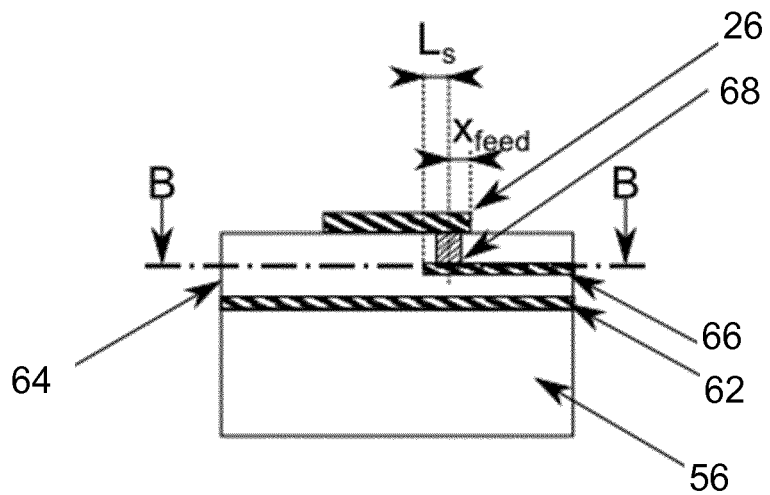
Figure 9:
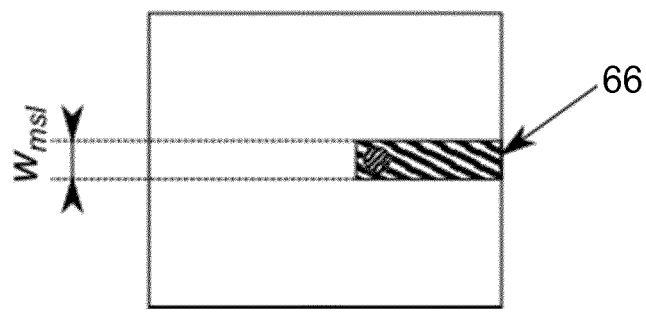

The antenna member 26 may be directly integrated on top of the receiver IC 56 or may otherwise be realized on any suitable substrate material such as high frequency PCB materials, which could be connected to the receiver IC 56, in this way implementing a signal detection in the receiver circuitry, as is schematically shown in FIG. 8. A microstrip line 66 in the IC 56 is electrically connected by a via 82 to an RF pad 78 that is arranged on the IC 56. The IC 56 is connected to the radio frequency (RF) PCB 74 with at least one metal layer applying the well-known flip chip technology (also known as controlled collapse chip connection) to the receiver IC 56. The RF PCB 74 can be of the same refractive index (relative permittivity) as the high-refractive index material of the first radar lens 36 or of a different relative permittivity. The RF PCB 74 relative permittivity and thickness should in this case be optimized for the antenna radiation into the first radar lens 36. The connection and placement of the top RF PCB 74 is controlled via flip chip bonding utilizing soldering material 80 to connect to a PCB pad 76. The PCB pad 76 connected electrically to the microstripline 66 is also electrically connected with another via to the antenna member 26 designed as a patch antenna.

A shielding layer 60, shielding the individual antenna members (26) from the neighboring antenna members, is galvanically connected with closely spaced vias, PCB pads (76), soldering material, RF pad (IC) (78) and an additional via to a grounded metal layer (62) on the receiver IC (56).

Instead of flip chip bonding, an antenna member 26 integrated as in FIG. 8 may also be coupled via aperture coupling to the transmission lines and/or receiver circuitry in the receiver IC 56.

The antenna member 26 may also be integrated in the packaging of the IC 56. In this case, ideally a packaging material permittivity and thickness should be optimized for an antenna radiation into the highly refractive material of the first radar lens 36.

A portion of the signals received by the antenna member 26 is transmitted by one or several of the following means to a transmission line: a) by a via connection (as exemplified in FIG. 9 and FIG. 10), b) by aperture coupling (exemplified in FIG. 11 and FIG. 12), or c) any other electromagnetic coupling mechanism. The cross section of the vias and slots is not limited to the geometries shown in the respective figures (circular and rectangular shape, respectively) but may take various cross section shapes such as, but not limited to, ellipses, squares or arbitrary closed shapes.

Figure 10:
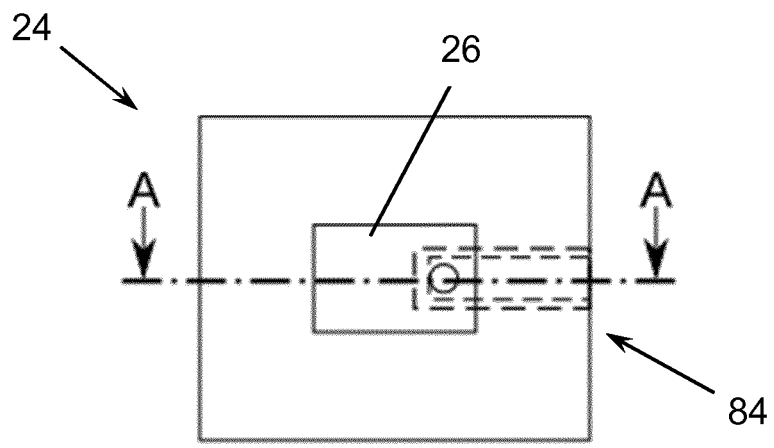
Figure 10:
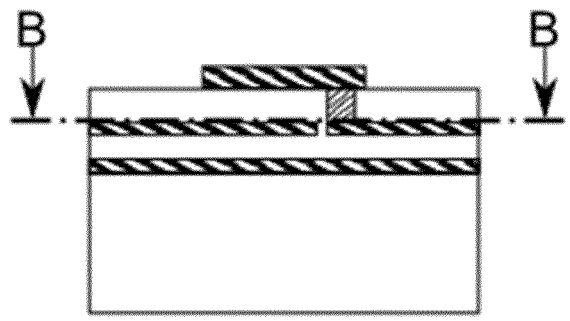
Figure 10:
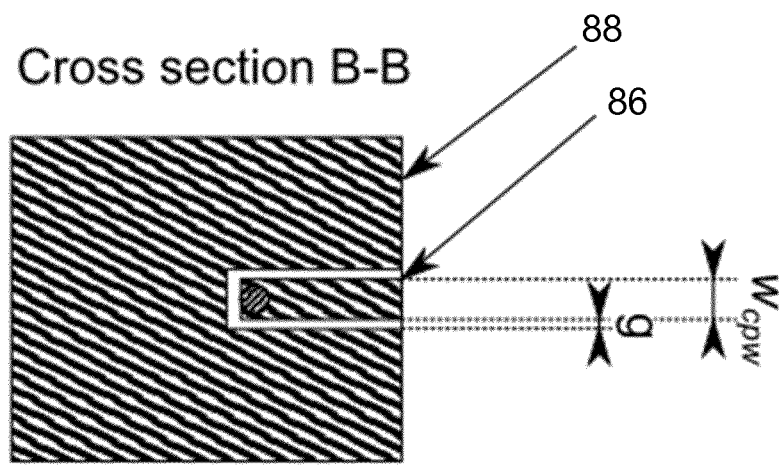

By means of such coupling mechanisms, the signals are transmitted to suitable transmission lines such as, but not limited to, microstrip line (MSL), coplanar wave guides (CPW) as demonstrated in FIG. 10, grounded CPW, stripline, differential microstrip lines or slot lines. The signals may also be directly transmitted to the receiver circuitry in the receiver IC 56 containing integrated active analog devices such as low-noise amplifiers, electronic mixers or analog-to-digital converters (ADCs) or other semiconductor devices.

In case a transmission line is used, ideally an input impedance of the antenna feed is matched to that of the transmission line. Such an impedance matching may be realized for instance by selecting a suitable position of the antenna feed ($x_{feed}$ in FIG. 9), adding an optional stub. Such a stub is exemplified in FIG. 9 and in FIG. 11 as open-ended MSL of length $L_s$ and $L_{stub}$, respectively. The stub may take other geometrical forms, thereby yielding suitable complex impedance values. For example, MSL open ends, shorts, e.g. by the connection to a ground layer using a via or radial stubs or combinations of these elements may be used for impedance matching. Furthermore, the impedance matching between antenna input feed and microstrip line may be increased by varying the transmission line dimensions, thereby varying the impedance of the transmission line. The impedance matching may also be realized using IC impedance matching methods at the input stage of the first receiving IC device. In general, a combination of some or all of these possibilities will allow sufficient impedance matching and thus a low input reflection coefficient of the antenna in the bandwidth of operation, limiting unnecessary losses.

FIG. 10 illustrates an embodiment of a radar receiver member 24 with a patch-type antenna member 26 and a coplanar waveguide feed 84, which includes a signal line 86 of width $w_{cpw}$ encompassed by a coplanar ground plane 88, leaving a gap of size g around the signal line 86.

Figure 11:
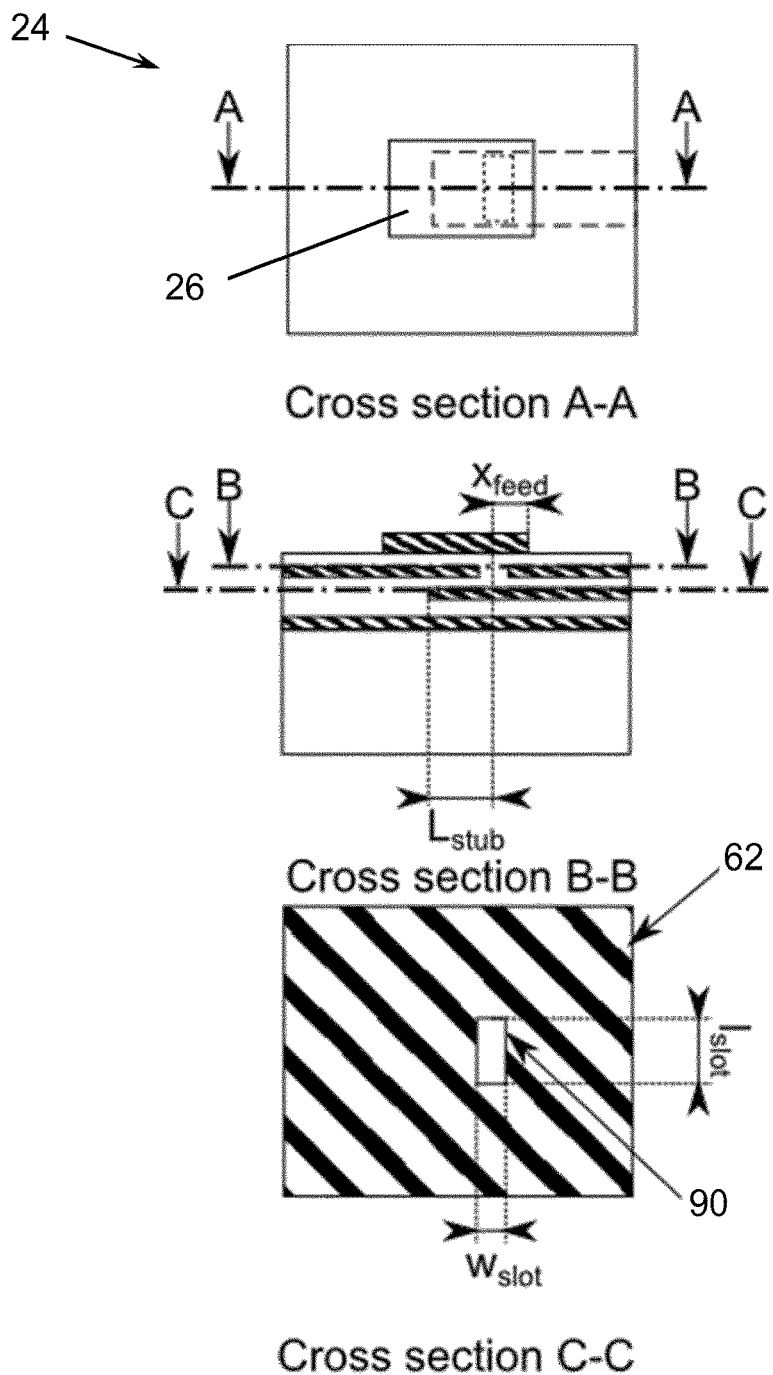

FIG. 11 shows an embodiment of a radar receiver member 24 with a patch-type antenna member 26 that is electromagnetically coupled by a slot aperture 90 of length $l_{slot}$ and width $w_{slot}$ to a microstrip line 66 feed of width $w_{msl}$. The slot aperture 90 is formed within the grounded metal layer 62.

Figure 12:
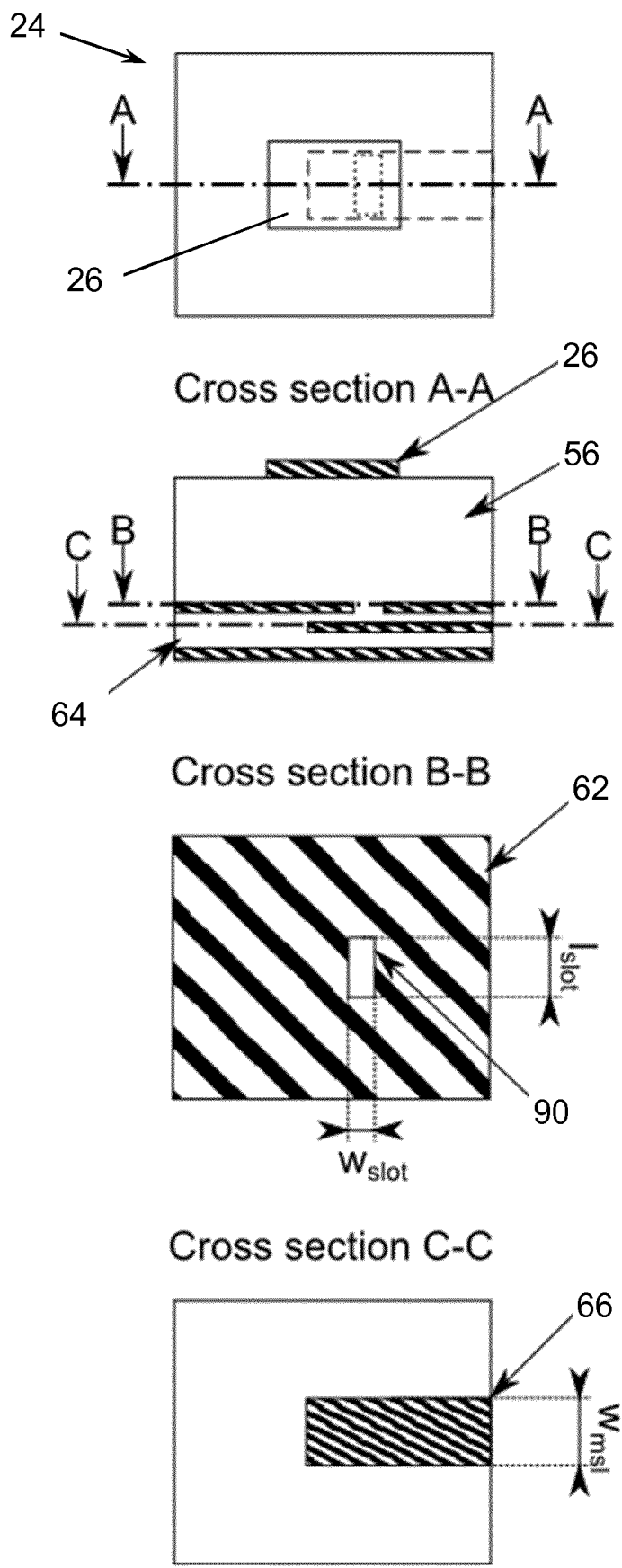

The embodiment shown in FIG. 12 is a back-illuminated IC 56. The antenna member 26 is on a backside of the receiver IC 56, and is electromagnetically coupled through a slot aperture 90 of length $l_{slot}$ and width $w_{slot}$ in the grounded metal layer 62 and the wafer material to microstrip line 66. The receiver circuitry of the receiver IC (56) is realized in the silicon between the antenna member (26) and the grounded metal layer (62).

Figure 16:
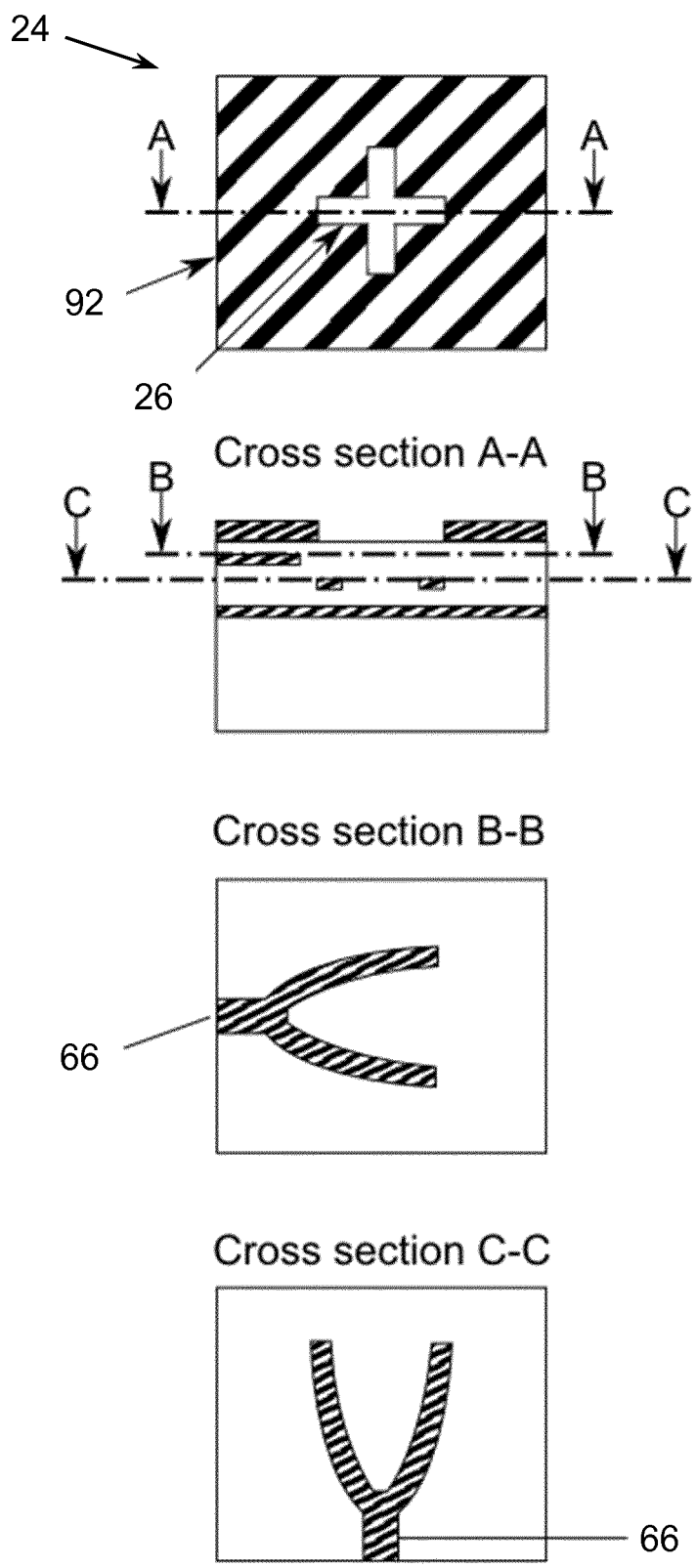

The radar receiver member 24 can also contain a resonant structure (i.e. an antenna member 26) that is configured for discriminating received radar waves according to their polarization (e.g. right- and left-handed circular polarization or horizontal and vertical polarization) as exemplified by embodiments of antenna members 26 illustrated in FIG. 13, FIG. 14 and FIG. 16 showing a separation according to horizontal and vertical polarization.

FIG. 13 illustrates an embodiment of an antenna member 26 designed as a polarimetric patch antenna. The patch antenna is galvanically connected by one via 68 each to two microstrip lines 66 of width $w_{msl}$ for distinction of incident radar waves between horizontal and vertical polarization.

In the embodiment of a radar receiver member 24 shown in FIG. 14, the polarimetric patch antenna has an alternative shape for increased cross polarization separation.

Figure 15:
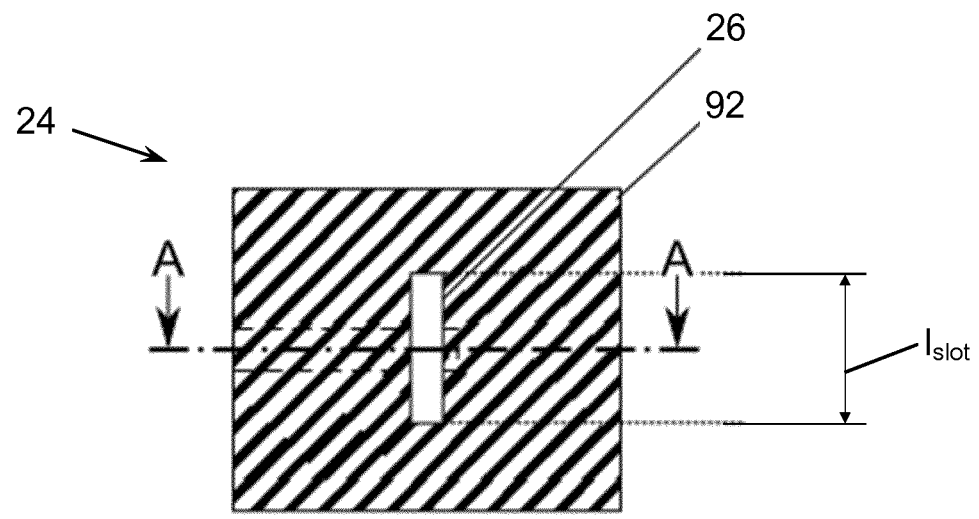
Figure 15:
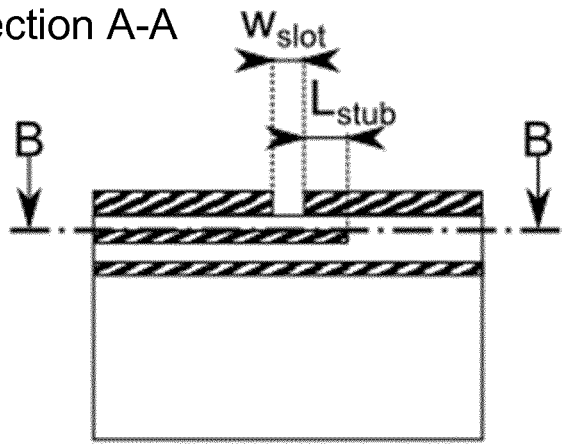
Figure 15:
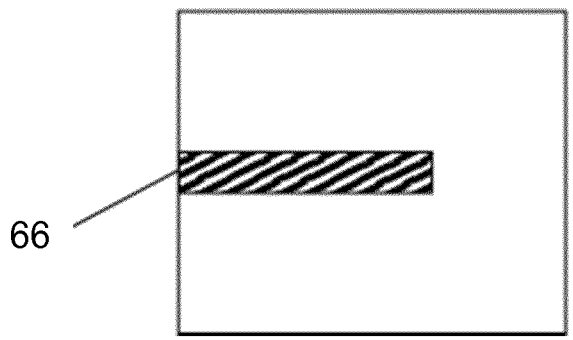

FIG. 15 shows an embodiment of a radar receiver member 24 with an antenna member 26 designed as a slot antenna featuring a slot of width $w_{slot}$ and length $l_{slot}$ in the top metal layer 92 of the IC 56. In this embodiment, the slot is coupled to a microstrip line 66. In other embodiments, the slot may be coupled to any other planar transmission line.

In the embodiment illustrated in FIG. 16, the radar receiver member 24 comprises an antenna member 26 designed as a crossed slot in the top metal layer 92 of the IC 56. Each rectangular slot electromagnetically couples to a microstrip line 66 feed. Each one of the microstrip line 66 feeds is formed by two transmission lines connected in parallel.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A radar wave imaging device, comprising:
a radar transmitter unit having at least one radar transmit antenna and being configured to transmit radar waves towards a scene,
a radar receiving unit that is configured to receive radar waves reflected by objects that have been illuminated by the radar waves transmitted by the transmitter unit, the radar receiving unit including a plurality of radar receiver members that are arranged as a two-dimensional array,
wherein the radar receiving unit includes an imaging radar optics unit for imaging at least a portion of the scene onto at least a portion of the two-dimensional array of radar receiver members, wherein the imaging radar optics unit comprises at least a first radar lens that is arranged between the radar receiver members and the scene, the first radar lens being a plano-convex lens having a half-sphere portion directed towards the scene and a cylindrical portion facing away from the scene, and wherein the radar receiver members are arranged in direct contact to a plane surface of the cylindrical portion of the first radar lens that is facing away from the scene such that the radar receiver members are at least partially encompassed by the first radar lens, and wherein the at least one radar transmit antenna and the plurality of radar receiver members are distinct.

2. The radar wave imaging device as claimed in claim 1, wherein the imaging radar optics unit includes at least one second radar lens that is arranged between the first radar lens and the scene.

3. The radar wave imaging device as claimed in claim 1, wherein the first radar lens comprises material having a refractive index larger than 3.0 at a radar carrier frequency of the radar waves to be transmitted.

4. The radar wave imaging device as claimed in claim 1, wherein the first radar lens includes at least one layer of anti-reflection coating at least on a surface directed towards the scene.

5. The radar wave imaging device as claimed in claim 1, wherein the radar transmitter unit is configured to modulate the radar waves to be transmitted, and wherein the modulation comprises at least one out of or a combination of amplitude modulation, frequency modulation and phase modulation.

6. The radar wave imaging device as claimed in claim 1, wherein the radar receiver members comprise at least one out of a patch antenna, a slot antenna or a dipole antenna.

7. The radar wave imaging device as claimed in claim 1, further comprising a receiver circuitry that is electrically connected to the plurality of radar receiver members and that is configured for analog and/or digital signal processing of the signals of the radar receiver members, wherein at least one of the radar receiver members comprises at least one resonating member that is resonant at a carrier frequency of the receiver circuitry.

8. The radar wave imaging device as claimed in claim 1, wherein at least one of the radar receiver members includes an antenna member that is configured for discriminating received radar waves according to their polarization.

9. The radar wave imaging device as claimed in claim 1, wherein the radar receiver members of the plurality of radar receiver members are mutually electromagnetically separated from each other by electromagnetic shields.

10. The radar wave imaging device as claimed in claim 1, wherein in the two-dimensional array, the radar receiver members are evenly spaced by a first spacing in a first dimension of the array, and are evenly spaced by a second spacing in a second dimension of the array that is perpendicular to the first dimension.

11. The radar wave imaging device as claimed in claim 1, wherein a spacing between the radar receiver members of the two-dimensional array is selected to be more than a factor of 0.5 times and less than a factor of 2.0 times a diffraction limited spot diameter of the imaging radar optics unit.

12. The radar wave imaging device as claimed in claim 1, wherein the radar transmitter unit and the plurality of radar receiver members are configured to operate in a single-input and multiple-output or a multiple-input and multiple-output configuration.

13. An electromagnetic radiation receiving unit that is configured to receive electromagnetic waves reflected by objects that have been illuminated by electromagnetic waves, the electromagnetic radiation receiving unit including a plurality of receiver members that are sensitive to the electromagnetic waves and are arranged as a two-dimensional array,
the receiving unit further comprising an imaging optics unit for imaging at least a portion of the scene onto at least a portion of the two-dimensional array of receiver members, wherein the imaging optics unit comprises at least a first electromagnetic lens that is configured to refract the electromagnetic radiation and is arranged between the receiver members and the scene, the first electromagnetic lens being a plano-convex lens having a half-sphere portion directed towards the scene and a cylindrical portion facing away from the scene, and wherein the receiver members are arranged in direct contact to a plane surface of the cylindrical portion that is facing away from the scene such that the receiver members are at least partially encompassed by the first lens, and wherein the at least one radar transmit antenna and the plurality of radar receiver members are distinct.

14. The radar wave imaging device as claimed in claim 1, wherein the first radar lens comprises material having a refractive index between 5.0 and 50.0 at a radar carrier frequency of the radar waves to be transmitted.

\* \* \* \* \*